US010177378B2

(12) United States Patent
Aksay et al.

(10) Patent No.: US 10,177,378 B2
(45) Date of Patent: Jan. 8, 2019

(54) ELECTRODES INCORPORATING COMPOSITES OF GRAPHENE AND SELENIUM-SULFUR COMPOUNDS FOR IMPROVED RECHARGEABLE LITHIUM BATTERIES

(71) Applicant: Vorbeck Materials Corp., Jessup, MD (US)

(72) Inventors: Ilhan A. Aksay, Princeton, NJ (US); Daniel Dabbs, Princeton, NJ (US); Michael A. Pope, Kitchener (CA)

( * ) Notice: Subject to any disclaimer, the term of this patent is extended or adjusted under 35 U.S.C. 154(b) by 0 days.

(21) Appl. No.: 15/055,505

(22) Filed: Feb. 26, 2016

(65) Prior Publication Data

US 2016/0254535 A1     Sep. 1, 2016

Related U.S. Application Data

(60) Provisional application No. 62/121,330, filed on Feb. 26, 2015.

(51) Int. Cl.

| H01M 10/052 | (2010.01) |
|---|---|
| H01M 4/58 | (2010.01) |
| H01M 4/62 | (2006.01) |
| H01M 4/136 | (2010.01) |
| H01M 4/74 | (2006.01) |
| H01M 4/66 | (2006.01) |

(52) U.S. Cl.
CPC ......... *H01M 4/5815* (2013.01); *H01M 4/136* (2013.01); *H01M 4/623* (2013.01); *H01M 4/625* (2013.01); *H01M 4/74* (2013.01); *H01M 4/663* (2013.01); *H01M 4/667* (2013.01); *H01M 4/668* (2013.01); *H01M 10/052* (2013.01)

(58) Field of Classification Search
CPC .......................... H01M 10/052; H01M 4/5815
See application file for complete search history.

(56) References Cited

U.S. PATENT DOCUMENTS

2009/0092902 A1*  4/2009  Abouimrane ....... H01M 10/056
                                                            429/306

OTHER PUBLICATIONS

Cui et al. (J. Am. Chem. Soc. 2013, 135, 8047-8056).*
Abouimrane et al. (J. Am. Chem. Soc. 2012, 134, 4505-4508).*
A.K. Geim, The Rise of Graphene, Nature Materials, Feb. 26, 2007, 183-191, vol. 6, Nature Publishing Group, London, UK.
Tsuneya Ando_The Electronic Properties of Graphene and Carbon Nanotubes, Oct. 2009, 17-21, vol. 1, NPG Asia Materials, Shinjuku, Tokyo.

* cited by examiner

*Primary Examiner* — Olatunji A Godo
(74) *Attorney, Agent, or Firm* — Trentice V. Bolar, Esq.

(57) ABSTRACT

Embodiments of the present invention relate to battery electrodes incorporating composites of graphene and selenium-sulfur compounds for improved rechargeable batteries. In one embodiment, a conductive composition comprises a conductive composition having a Se—S compound, a conductive additive. The Se—S compound is present as $Se_xS_{8-x}$, wherein $0<x<8$.

19 Claims, 3 Drawing Sheets

ELECTRODES INCORPORATING COMPOSITES OF GRAPHENE AND SELENIUM-SULFUR COMPOUNDS FOR IMPROVED RECHARGEABLE LITHIUM BATTERIES

CROSS-REFERENCE TO RELATED APPLICATIONS

This application claims priority to U.S. Provisional Application No. 62/121,330 filed Feb. 26, 2015, which is hereby incorporated herein by reference.

STATEMENT REGARDING FEDERALLY SPONSORED RESEARCH OR DEVELOPMENT

This invention was made with government support under Grant No. DE-AR0000319 awarded by the Advanced Research Projects Agency-Energy (ARPA-E) of the United States Department of Energy. The U.S. Government has certain rights in this invention.

TECHNICAL FIELD

BACKGROUND

The present invention relates generally to battery electrodes and specifically to battery electrodes incorporating composites of graphene and selenium-sulfur compounds. Lithium sulfur batteries have a high theoretical capacity for storing energy. However, sulfur is an electrical insulator, which typically requires combining the material with a conductive additive, such as a carbonaceous material, to form a composite electrode. While such a material may increase conductivity, the carbonaceous material does not contribute to the capacity of the batter to store charge. Furthermore, the carbonaceous material typically increases the mass of the device, which concomitantly reduces the apparent charge density of the device.

The charge and discharge of the device at high rates typically requires that a significant mass fraction of the electrode comprise the conductive additive, which can result in a deleterious effect on the apparent charge capacity density of the device.

DETAILED DESCRIPTION

Figure 1:
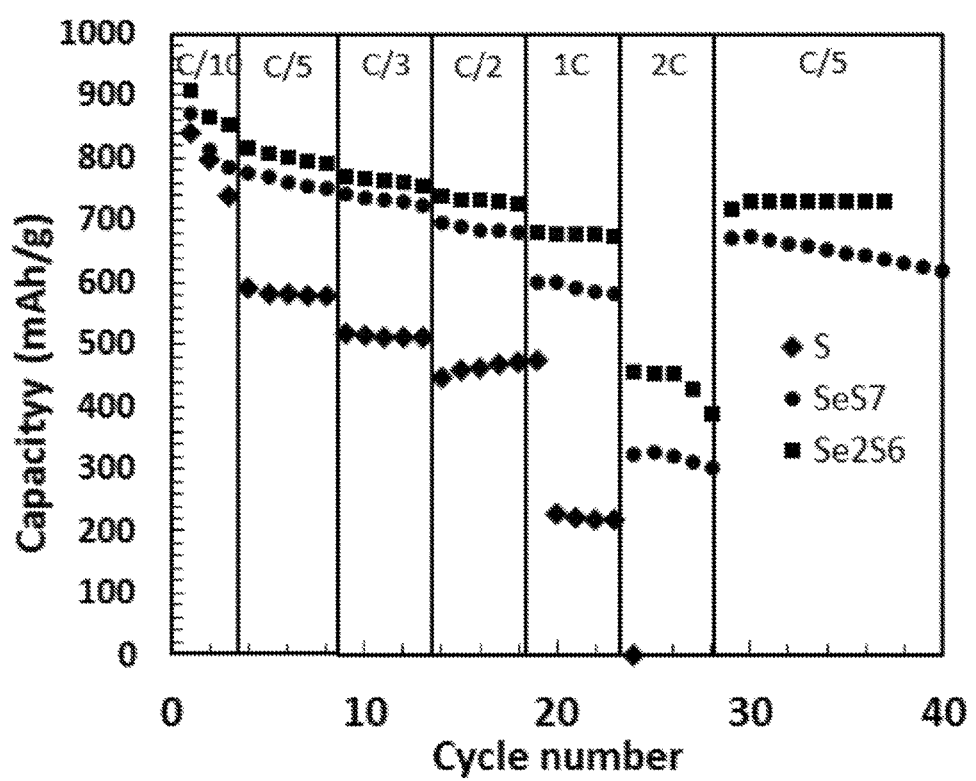
FIG. 1 depicts a graph reflecting capacity at various rates of batteries comprising differing Se—S compounds, in accordance with an embodiment of the present invention.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Lithium sulfur ("Li—S") batteries have a high theoretical capacity for storing energy. However, sulfur is an electrical insulator, which is typically requires combining the material with a conductive additive, such as a carbonaceous material, to form a composite electrode. While such material may increase conductivity, the carbonaceous material does not contribute to the capacity of the battery to store charge. Furthermore, the carbonaceous material typically increases the mass of the device, which concomitantly reduces the apparent charge density of the device. The charge and discharge of the device at high rates typically requires that a significant mass fraction of the electrode comprise the conductive additive, which can result in a deleterious effect on the apparent charge capacity density of the device.

The development of high-energy high density electrodes for Li-ion batteries can facilitate the development and adaptation of electrical devices, such as consumer electronics and electric vehicles, and renewable energy storage. Embodiments of the present invention comprise electrodes incorporating composites of individual graphene sheets and selenium-sulfur compounds for improving electrical characteristics of batteries, such as lithium batteries. Li—S batteries typically exhibit poor cycle life due to the solubility of intermediate species formed as S converts to $Li_2S$ during charge and discharge of the battery. These intermediates are referred to as polysulfides. During charge or discharge, the dissolved polysulfides migrate from the cathode to the anode where they can precipitate and foul the anode leading to irreversible loss of battery capacity during cycling.

Replacing all of part of the sulfur material with a more conductive material can reduce the quantity of carbonaceous material needed. Selenium ("Se") does not have as high a theoretical capacity as sulfur (1675 mAh/g for sulfur versus 680 mAh/g for Se), but does have a higher conductivity. Hence, the addition of Se to electrode material of the present invention can theoretically increase the conductance of the electrode, but at the cost of lowering capacity.

Surprisingly, electrodes of the present invention comprises a composition of Se, sulfur, and individual graphene sheets ("the composition") that does not exhibit a decrease in capacity compared to electrodes formed of a composition of graphene sheets and sulfur alone. On the contrary, the capacity of such composites actually exceed the capacity of the Se deficient electrode when operated at higher rates. In addition, the composition displayed an improved cycle-life compared to when the composition lacks Se, which suggests that the presence of Se in the composition addresses the aforementioned issues exhibited with the polysulfides.

The Se—S compounds of the present invention can be utilized as battery electrodes, such those having high mass and volume specific electrical energy storage capacity. The Se—S compounds of the present invention are limited to $Se_xS_{8-x}$, wherein x is used to indicate the stoichiometry of the compound, and wherein $0<x<8$. Hence, x also encompasses non-integer values. In certain mbodiments, $1 \leq x \leq 4$ exhibit preferred electrical characteristics.

Se—S compounds can also comprise conductive additives to further increase the electrode's performance. Conductive additives can comprise carbonaceous material, such as graphite, multi-layered graphene, single sheets of graphene, thermally exfoliated graphite oxide, chemically or thermally reduces graphene oxide or graphite oxide, single- and multi-walled carbon nanotubes, hard carbon, soft carbon, carbon aerogels, carbon xerogels, carbide-derived carbons, templated carbons or activated carbons. Conductive additives can comprise materials capable of conducting electrons or holes such as a semiconductor, semi-metals, and metals. Note that mesoporous carbon is not compatible with embodiments of the present invention as the desired performance improvements are lacking.

Conductive additives can be present in the final battery electrode at a loading of 0 to 10%, 10% to 20%, 20% to 30%, 30% to 40%, 40% to 50%, 50% to 60%, 60% to 70%, 70% to 80%, 80% to 90%, and/or 90% to 99% on a dry mass basis. Se and S can be mixed together in various ways, such as simple mixing, milling/grinding (wet or dry), ultrasonication, dissolution in solvent and precipitation, melting, sublimation or vapor deposition. In particular, dissolution of sulfur and Se can be achieved at various temperatures in solvents, such tetrahydrofuran, carbon disulfide, dimethylsulfoxide or other solvents capable of dissolving significant amounts of these materials.

Se and S can be used in a dissolved form or precipitated to form a solid compound by a suitable method such as cooling from solution to reduce the Se and S solubility or adding the solution to another solvent, such as water, to reduce the solubility thereof and cause precipitation. The conductive additive can be mixed with the Se and S prior to or subsequent to the formation of the Se—S compound. For example, Se and S can be blended with the conductive additive by grinding/milling, etc. Se and S can be melted and mixed directly with the conductive additive. Se and S can be sublimated or vaporized and condensed directly on the surface of the conductive additive. Dissolved Se and S can also be precipitated from solution directly onto the conductive additive from one or more of the solvents disclosed herein. Alternatively, Se and/or S can be formed onto the conductive additive by electrodeposition.

The crystalline phrase, morphology, or nanostructure of the resulting Se—S compound can be tuned using various techniques implemented before, during, or after mixing with the conductive additive. For example, a structure directing agent such as a surfactant, lipid emulsion either bound to the additive or dissolved or dispersed in solvent that can be used to template the growth of Se—S crystals or amorphous particles with a predefined shape or size. A conductive additive with a controlled pore-size or structure can also be used to control the size and shape of the deposited Se—S compound.

The resulting materials can be deposited onto a conductive current collector, which includes, but is not limited to, a conductive carbon, aluminum, aluminum coated with a conductive carbon material, copper, titanium, or tungsten. The carbon or metallic coating can be a thin film laminated on a plastic substrate, such as polypropylene or polyethylene terephthalate. The current collector can be in the form of a sheet or mesh. The Se—S compound and/or carbon additive which form the battery electrode can be coated on or impregnated into the current collector using a suitable technique, which includes, but is not limited to, casting, pressing, ink jet printing, and screen printing.

Electrode fabrication may involve the use of a binder such as a sulfonated tetrafluoroethylene based fluoropolymer-copolymer, polyvinylidene fluoride, and polytetrafluoroethylene. Such binders may be added during or subsequent formation of the Se—S compound and mixed with the conductive additive. Battery operation requires an appropriate electrolyte consisting of a solvent and dissolved salt or a molten salt alone is typically utilized to facilitate Li ion transport between the Se—S compound and a second electrode. The solvent can comprise water, 1,3-dioxolane, dimethylether, ethylene carbonate, propylene carbonate, diethylene carbonate, γ-butyrolactone and/or a solvent capable of dissolving lithium salts.

The solvent can comprise molten salts, such as 1-ethyl 3-methylimidazolium bis(trifluoromethylsulfonyl) imide. Lithium salts can comprise lithium perchlorate, lithium bis(trifluoromethylsulfonyl) imide, lithium nitrate, lithium tetrafluoroborate, and/or lithium hexafluorophosphate. The electrolyte can be added to the electrode material before or after coating onto the current collector. A suitable membrane can be utilized to electrically separate the Se—S compound containing electrode from the second electrode. The membrane can comprise a porous polymer that will not dissolve in the electrolyte, such as polypropylene, polyethylene terephthalate, cellulose, and polytetrafluoroethylene.

Battery operation requires that the electrode comprising the composition be coupled to a second electrode. For example, the second electrode may comprise lithium metal which is in ionic but not electronic communication with the composition. Alternatively, the second electrode can be a material which can reversibly accept or emit lithium ions and has a resting potential above or below that of the Se—S compound, such a graphite, lithiated graphite or silicon. Batteries of the present invention may be assembled in typical battery configurations, which includes, but is not limited to, coin cells and pouch cells.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

The present invention, thus generally described, will be understood more readily by reference to the following examples, which are provided by way of illustration and are not intended to be limiting of the present invention.

EXAMPLES

The disclosed approach has been tested experimentally. Experimental data is reflected in FIGS. 1-3. Here, two different Se—S compounds, $SeS_7$ and $Se_2S_6$, were prepared by dissolving Se and S in an appropriate ratio in dimethylsulfoxide. Thermally exfoliated graphite oxide, as disclosed in U.S. Pat. No. 7,658,901 to Prud'Homme et al., which is incorporated herein in its entirety, was used as the carbonaceous material and dispersed in water using a surfactant. The two solutions were combined, which resulted in the precipitation of the Se—S compound onto the carbonaceous material. Subsequent to filtration and washing, the filter cake was pressed into an aluminum mesh, dried and tested as a battery sandwiching a porous polypropylene membrane between this electrode and lithium metal using a standard stainless steel coin cell assembly.

The current used to discharge the cells is specified in terms of a C-rate, wherein C is 1675 mAh/g. The loading of each electrode was about 4.5 mg/cm³. The same procedure was used to prepare electrodes lacking Se. A comparison of the behavior at various C-rates is depicted in FIG. 1. Here, both samples comprising SeS$_7$ and Se$_2$S$_6$ exceed the capacity of samples comprising S at low charge/discharge rates and exhibit an improved capacity of about 300% and about 350%, respectively, at 1 C. Hence, samples comprising SeS$_7$ and Se$_2$S$_6$ both exhibit an improved cycling stability.

Figure 2:
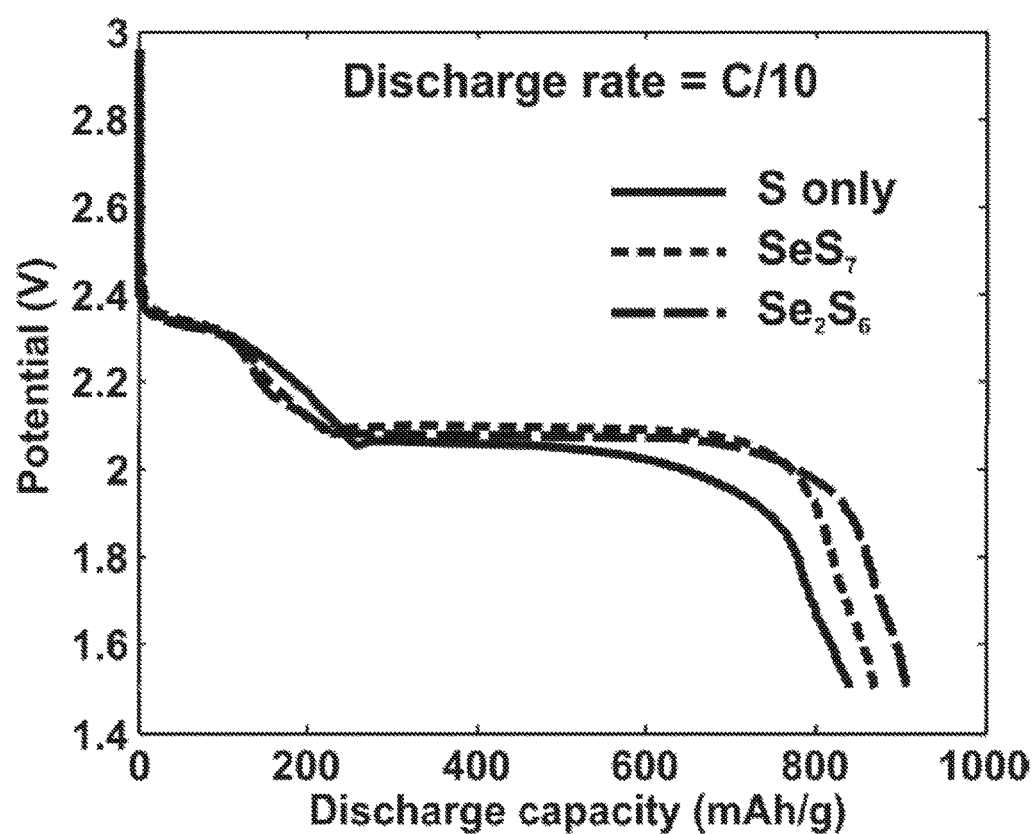
FIG. 2 depicts a graph reflecting discharge profiles at C/10 of batteries comprising differing Se—S compounds, in accordance with an embodiment of the present invention.
Figure 3:
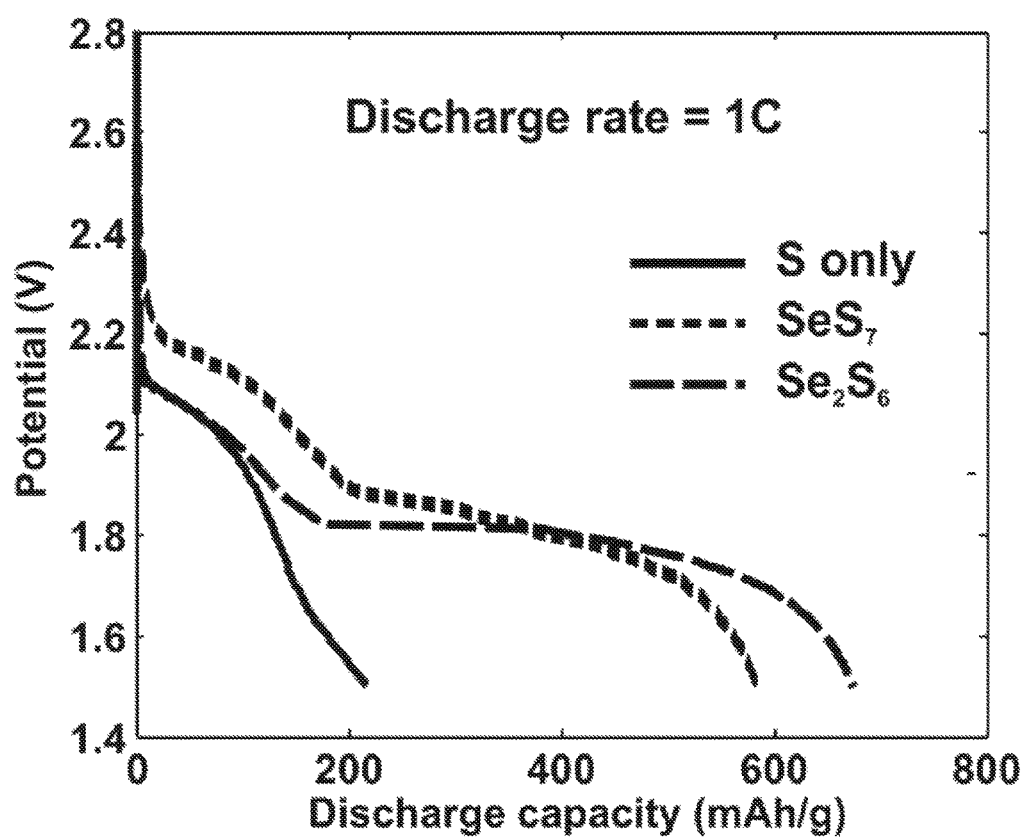
FIG. 3 depicts a graph reflecting discharge profiles at 1 C of batteries comprising differing Se—S compounds, in accordance with an embodiment of the present invention.

FIGS. 2-3 compare the capacity versus discharge curves for the aforementioned samples at two rates of charge/discharge. FIG. 2 compares discharge capacities of the aforementioned samples, in accordance with an embodiment of the present invention. Here, FIG. 2 illustrates that the addition of Se does not statistically reduce the discharge capacity of the battery compared to samples lacking Se. FIG. 3 depicts the discharge curves at a fast discharge rate of 1 C, in accordance with an embodiment of the present invention. Here, the S only battery exhibited a discharge capacity of about 225 mAh/g In contrast, the discharge capacity of the battery samples comprising SeS$_7$ and Se$_2$S$_6$ ranged from about 590 mAh/g to about 675 mAh/g at 1 C.

While certain embodiments have been illustrated and described, it should be understood that changes and modifications can be made therein in accordance with ordinary skill in the art without departing from the technology in its broader aspects as defined in the following claims. As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 2% of the particular term.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can of course vary. It is also to be understood that the terminology used herein is for the purpose of describing particular embodiments only, and is not intended to be limiting.

What is claimed is:

1. A battery electrode comprising:
    a conductive composition having
        a selenium-sulfur compound;
        a conductive additive; and
        wherein
            the selenium-sulfur compound is present as Se$_x$S$_{8-x}$; $1<x<8$; and
            the conductive additive comprises individual graphene sheets.

2. The battery electrode of claim 1, wherein $1 \leq x \leq 4$.

3. The battery electrode of claim 1, wherein selenium-sulfur compound comprises Se$_2$S$_6$.

4. The battery electrode of claim 1, wherein the conductive additive further comprises graphite, thermally exfoliated graphite oxide, chemically or thermally reduced graphene oxide or graphite oxide, single walled carbon nanotubes, multi-walled carbon nanotubes, a hard carbon, a soft carbon, a carbon aerogel, a carbon xerogel, carbide-derived carbon, a templated carbon, and/or an activated carbon.

5. The battery electrode of claim 1, wherein the conductive additive further comprises a material that conducts electrons or holes, a semiconductor, a semi-material, and/or a metal.

6. The battery electrode of claim 1, wherein the conductive composition further comprises:
    a binder in communication with the selenium-sulfur compound and the conductive additive; and
    wherein the binder comprises a sulfonated tetrafluoroethylene based fluoropolymer-copolymer; polyvinylidene fluoride, and/or polytetrafluorethylene.

7. The battery electrode of claim 1, further comprising:
    a conductive substrate in electrical communication with the conductive composition;
    wherein the conductive substrate is in the form of a sheet or mesh; and
    wherein the conductive substrate comprises a conductive carbon, aluminum, aluminum coated with a conductive carbon material, copper, titanium, and/or tungsten.

8. The battery electrode of claim 1, further comprising:
    a conductive substrate in electrical communication with the conductive composition;
    wherein the conductive substrate is in the form of a sheet or mesh;
    wherein the conductive substrate comprises a polymer substrate; and
    a carbonaceous material and/or a metallic coating thin film laminated on the conductive substrate.

9. The battery electrode of claim 1, further comprising:
    a conductive substrate in electrical communication with the conductive composition;
    wherein the conductive substrate is in the form of a sheet or mesh; and
    wherein the conductive composition is coated on or impregnated into the conductive substrate.

10. The battery electrode of claim 1, further comprising:
    a conductive substrate in electrical communication with the conductive composition;
    wherein the conductive composition is loaded on the conductive substrate at about at least 4.5 mg/cm$^2$.

11. A method for fabricating a battery electrode comprising:
    forming conductive compound;
    applying the conductive compound onto a conductive substrate;
    wherein the conductive compound comprises:

a selenium-sulfur compound;
a conductive additive; and
wherein
the selenium-sulfur compound is present as $Se_xS_{8-x}$; $1 < x < 8$
the conductive additive comprises individual graphene sheets.

12. The method of claim 11, wherein $1 \leq x \leq 4$.

13. The method of claim 11, wherein the conductive substrate comprises a conductive carbon, aluminum, aluminum coated with a conductive carbon material, copper, titanium, and/or tungsten.

14. The method of claim 11, wherein the selenium-sulfur compound is formed by mixing, wet or dry milling, wet or dry grinding, ultrasonication, dissolution in solvent and precipitation, melting, sublimation, and/or vapor deposition.

15. The method of claim 11, wherein the conductive composition further comprises:
a binder in communication with the selenium-sulfur compound and the conductive additive; and
wherein the binder comprises a sulfonated tetrafluoroethylene based fluoropolymer-copolymer; polyvinylidene fluoride, and/or polytetrafluorethylene.

16. The method of claim 11, wherein
the conductive substrate is in the form of a sheet or mesh; and
the conductive substrate comprises a conductive carbon, aluminum, aluminum coated with a conductive carbon material, copper, titanium, and/or tungsten.

17. The method of claim 11, wherein Se—S compound is sublimated or vaporized and condensed on to the conductive additive surface.

18. The method of claim 11, wherein the conductive additive further comprises a carbonaceous material comprising graphite, thermally exfoliated graphite oxide, chemically or thermally reduced graphene oxide or graphite oxide, carbon nanotubes, a hard carbon, a soft carbon, a carbon aerogel, a carbon xerogel, carbide-derived carbon, a templated carbon, and/or an activated carbon.

19. A lithium battery comprising the battery electrode of claim 1.

* * * * *